US012665312B2

(12) United States Patent
Menargues Gomez et al.

(10) Patent No.: US 12,665,312 B2
(45) Date of Patent: Jun. 23, 2026

(54) DUAL-POLARIZED ANTENNA ARRAY

(71) Applicant: SWISSto 12 SA, Renens (CH)

(72) Inventors: Esteban Menargues Gomez, Préverenges (CH); Santiago Capdevila Cascante, Renens (CH)

(73) Assignee: SWISSto12 SA, Renens (CH)

( * ) Notice: Subject to any disclaimer, the term of this patent is extended or adjusted under 35 U.S.C. 154(b) by 50 days.

(21) Appl. No.: 18/701,734

(22) PCT Filed: Oct. 18, 2022

(86) PCT No.: PCT/IB2022/059970
§ 371 (c)(1),
(2) Date: Apr. 16, 2024

(87) PCT Pub. No.: WO2023/067482
PCT Pub. Date: Apr. 27, 2023

(65) Prior Publication Data

US 2025/0233311 A1 Jul. 17, 2025

(30) Foreign Application Priority Data

Oct. 18, 2021 (FR) ....................................... 2111032

(51) Int. Cl.
*H01Q 13/02* (2006.01)
*H01Q 15/24* (2006.01)

(52) U.S. Cl.
CPC ............................... *H01Q 13/0258* (2013.01)

(58) Field of Classification Search
CPC ........... H01Q 13/0241; H01Q 13/0258; H01Q 13/0275; H01Q 15/24
See application file for complete search history.

(56) References Cited

U.S. PATENT DOCUMENTS 4,356,459 A 10/1982 Gould et al.
4,885,556 A * 12/1989 Lamberty ................ H01P 1/17 333/248

(Continued)

FOREIGN PATENT DOCUMENTS

EP 3147992 A1 3/2017
EP 3618172 B1 11/2021

(Continued)

OTHER PUBLICATIONS

Ihmels, et al., Field Theory Design of a Corrugated Septum OMT; IEEE MTT-S Digest, 1993, pp. 909-912.

(Continued)

*Primary Examiner* — Hoang V Nguyen
(74) *Attorney, Agent, or Firm* — McDonald Hopkins LLC

(57) ABSTRACT

An antenna array includes at least two antennas with dual polarization, each antenna including: at least one first port intended for a first signal with a first polarization; at least one second port intended for a second signal with a second polarization; a polarizer including a septum for combining the signal on the first port with the signal on the second port; a polarization-preserving evanescent filter, one end of which is directly coupled to the polarizer and the other end is directly coupled to the ether. The evanescent filter includes an internal channel with at least one internal face provided with protuberances to match the impedance of the antenna to that of the ether.

19 Claims, 3 Drawing Sheets

(56) References Cited

U.S. PATENT DOCUMENTS

| | | | |
|---|---|---|---|
| 7,746,190 B2 | 6/2010 | Vanin et al. | |
| 9,478,838 B2 | 10/2016 | Wolf et al. | |
| 10,992,050 B2 * | 4/2021 | Goto | H01P 1/171 |
| 2012/0319799 A1 | 12/2012 | Wolf et al. | |
| 2017/0077610 A1 | 3/2017 | Bongard et al. | |
| 2020/0381794 A1 | 12/2020 | Yukawa et al. | |

FOREIGN PATENT DOCUMENTS

| | | |
|---|---|---|
| FR | 3094575 A1 | 10/2020 |
| JP | H05055806 A | 3/1993 |
| JP | H11504194 A | 4/1999 |
| KR | 10-2009-0024061 A | 3/2009 |
| KR | 10-2015-0000523 A | 1/2015 |
| WO | 2018216071 A1 | 11/2018 |
| WO | 2018216210 A1 | 11/2018 |

OTHER PUBLICATIONS

The International Search Report issued in corresponding International Patent Application No. PCT/IB2022/059970; Dated: Jan. 31, 2023.

Seng Yong Yu, et al, "New Evanescent-Mode Filter Designs in Circular Waveguide Using a Classical Bigenvalue Mode-Spectrum Analysis", 2009 German Microwave Conference, published in 2009, DOI: 10.1109/GEMIC.2009.4815880; (URL:https://ieeexplore.ieee.org/document/4815880 ).

Japan Patent Office (JPO), First Notice of Reason for Rejection for Patent Application No. 2024-522480 drafted May 2, 2025, Japan.

* cited by examiner

DUAL-POLARIZED ANTENNA ARRAY

This application claims priority from French patent application FR2111032 filed on Oct. 18, 2021, the contents whereof are entirely incorporated.

TECHNICAL AREA

The present invention concerns a dual-polarized antenna array, in particular each dual-polarized antenna integrating a polarizer and an evanescent filter.

STATE OF THE ART

Antennas are components used to transmit electromagnetic signals into free space, or to receive such signals. Simple antennas, such as dipoles, have limited performance in terms of gain and directivity. Parabolic antennas offer higher directivity, but are bulky and heavy, making them unsuitable for applications such as satellites, where weight and volume need to be reduced.

Also known are antenna arrays that combine several radiating elements (antenna elements) out of phase in order to improve gain and directivity. The signals received on or emitted by the various radiating elements are amplified and phase-shifted to control the shape of the array's receive and transmit lobes.

Dual-polarized antennas are also known, capable of simultaneously transmitting and receiving signals with two polarizations. In this case, the signals transmitted or received by each antenna element are combined, respectively separated, according to their polarization by means of a polarizer. The polarizer can also be integrated into the antenna element. A dual-polarized antenna has two ports for connecting each of the two polarizations separately to or from electronic circuitry or waveguides.

In addition, it is often necessary to reduce the size of the antenna, especially its width and height in the plane perpendicular to the signal transmission direction, so that it can be housed in the reduced volume available in a satellite or aircraft.

Such antennas for transmitting high frequencies, particularly microwave frequencies, are difficult to design. In particular, it is often desirable to place the individual elementary antennas of the array as close together as possible, in order to reduce the overall footprint and attenuate the amplitude of secondary transmit or receive lobes, in directions other than the transmit or receive direction that is to be preferred. However, this reduction in the size and spacing of elementary antennas creates problems of reflection of a portion of the transmit signal back to the antenna or to another port. The result is a loss of efficiency in the transfer of transmitted energy, and disturbance of each port by signals transmitted on other ports.

One of the aims in designing such an antenna is also to reduce its weight, particularly in space and aeronautics applications.

Another aim is to provide an antenna suitable for LHCP and RHCP polarized satellite communications.

Finally, it is also desirable to produce antennas with a modular design that allows the number of elementary antennas to be varied according to need, without having to redesign the entire antenna. The design is said to be modular when different antenna types can easily be designed by adding or removing standardized antenna elements during the antenna design phase, without having to redesign the entire antenna or waveguide array.

Naturally, the antenna must also have very high efficiency, gain and radiation pattern characteristics, compatible with the application's specifications.

Finally, it must be possible to manufacture the antenna industrially, without falling within the protection of existing patents.

U.S. Pat. No. 9,478,838 B2 discloses an orthomode coupler comprising a first septum polarizer and a second polarizer with circular cross-section coaxially coupled to the first and allowing the two polarizers to be rotated relative to each other in the coaxial direction so that the phases of the signals generated by the first polarizer can be adjusted.

EP 3 618 172 A1 discloses an antenna device and an antenna array device, comprising a septum polarizer, one inner face of which is provided with protuberances intended to improve the axial ratio of the device.

US 2020/381794 A1 discloses a septum polarizer provided with four longitudinal ridges and a portion projecting inwardly from the polarizer channel, this projecting portion being disposed on an inner wall of the polarizer in direct proximity to the widest part of the septum.

BRIEF SUMMARY OF THE INVENTION

One aim of the present invention is to provide an antenna with dual polarization free from the limitations of known antennas.

According to the invention, these aims are achieved in particular by means of an array of antennas with dual polarization, each antenna comprising:

- at least one first port intended for a first signal with a first polarization;
- at least one second port intended for a second signal with a second polarization;
- a polarizer, comprising a septum allowing to combine the signal on the first port with the signal on the second port;
- a polarization-preserving evanescent filter, one end of which is directly coupled to the polarizer and the other end is directly coupled to the ether, said evanescent filter comprising an internal channel with at least one internal face provided with protuberances to match the impedance of the antenna to that of the ether.

Polarization-preserving filters for filtering dual-polarized signals are known as such. An example of such a filter is described in EP3147992A1. This filter is not evanescent, however, and is not intended to be coupled to the ether. Moreover, this filter is not subwavelength.

Evanescent mode waveguide filters ("evanescent mode filters") are also known in their own right. An example of such a filter is described in U.S. Pat. No. 7,746,190B2. However, this filter has a single input and is not intended to be coupled to a polarizer downstream. Nor is it intended to be coupled to the ether downstream.

Evanescent filters are generally composed of a hollow waveguide, which transmits electromagnetic energy between an input port and an output port. Evanescent-mode filters have the advantage of high selectivity and reduced weight and bulkiness. They are usually used between two components, for example between two waveguide sections, but not at the output of a radiating element of an antenna. They are not generally intended for direct coupling with ether.

The evanescent filter at the output of each antenna in the array allows to match the output impedance of the antenna to that of the ether, thus maximizing energy transfer from the antenna to the ether, by limiting reflection of the transmit signal at the interface between the antenna and the ether.

The diameter of this internal channel (i.e. the largest dimension of its cross-section) is smaller than the nominal wavelength of the signal for which each antenna is designed.

The diameter of this internal channel (i.e. the largest dimension of its cross-section) is smaller than the smallest wavelength of the signal that each antenna is designed to transmit ("nominal smallest wavelength").

The septum preferably does not extend to the end on the ether side of each antenna.

Each evanescent filter may comprise a number of successive protuberances arranged symmetrically in the waveguide channel. These protuberances form impedances which, in combination with the channel capacities, form resonant filters.

Each polarizer can be equipped with two ridges, three ridges or of a larger number of longitudinal ridges, in addition to the septum.

These ridges preferably do not extend to the end on the ether side of the antenna.

The last segment of each antenna on the ether side is advantageously devoid of septum and ridges, and forms an iris between the polarizer and the ether, for impedance matching.

The last segment of each antenna on the ether side is advantageously free of protuberances, and forms an iris between the polarizer and the ether, for impedance matching.

Each evanescent filter can be provided with several successive protuberances arranged along longitudinal lines, for example along 3 or 4 longitudinal lines in the filter channel.

These longitudinal lines may be in the extension of said ridges.

These protuberances can therefore form 3 or 4 discontinuous ridges.

Each antenna is preferably sub-wavelength.

The diameter of the second end of each evanescent filter can be smaller than the nominal half-wavelength of said signals.

This type of antenna is particularly compact, but increases the risk of unwanted reflection of the transmitted signal towards another port. The evanescent filter allows this reduction in diameter without the risk of unwanted reflection.

The protuberances of the evanescent filter can each comprise a first and a second surface in the direction of signal transmission, the first surface being inclined relative to the second surface.

The inclined surface of each protuberance can be oblique to the plane perpendicular to the antenna's longitudinal axis.

The inclined surface of each protuberance can form an angle ($\alpha$) of between 20° and 80°, preferably between 20° and 40°, with respect to said internal face.

The filter channel of each antenna can have a circular, square, rectangular, hexagonal or octagonal cross-section orthogonal to its longitudinal axis (disregarding ridges or protuberances).

The protuberances can be arranged along three sides of the channel.

The protuberances can be arranged along four sides of the channel.

The evanescent filter of each antenna is preferably not flared. The cross-section of its internal channel is therefore substantially constant along its longitudinal axis, with the exception of protuberances that reduce the surface area of these internal channel cross-sections.

The antenna array is preferably miniaturized in that the periodicity of the antenna array is smaller than or equal to 80% of the nominal wavelength of the signals transmitted/received by each antenna.

The channel of each antenna in the array advantageously comprises a cross-section invariant to rotation by 120° around the longitudinal axis of the channel, with protuberances and/or longitudinal ridges spaced 120° apart.

Advantageously, the antenna array is produced in a monolithic way.

Each antenna of the antenna array is advantageously produced by 3D printing of a metal or polymer core, then depositing a conductive layer at least on the internal faces of the antenna.

The first port can be fitted with a first flange for connection to a first waveguide. The second port can be provided with a second flange for connection to a second waveguide.

Both flanges can be 3D printed.

Each antenna can be manufactured by a process including an additive manufacturing step, for example of the SLM type in which a laser or electron beam fuses or sinter several thin layers of a powdery material.

Additive manufacturing can be observed on the antenna thus produced by analyzing the structure of the metal grains sintered into the layer.

Metal additive manufacturing enables complex shapes to be produced with fewer or no assembly steps, thus reducing manufacturing costs.

Additive manufacturing also makes it possible to manufacture antennas without, or with a reduced number of, means of assembly between sub-components, which also makes it possible to reduce the weight of the antenna.

Waveguide devices have been known to be manufactured by additive printing. The complex shapes of evanescent filters, however, do not lend themselves to additive manufacturing due to the many cantilevered surfaces, particularly the surfaces forming the roof of resonator cavities.

Most additive printing processes, and in particular selective laser melting (SLM) processes, impose a minimum angle, e.g. 20 or 40°, to avoid the risk of sagging of a new layer deposited as a cantilever. It is therefore impossible to print certain portions of evanescent filters, or at least to print them with the desired precision.

In order to avoid these disadvantages, it is therefore proposed to use additive printing to produce an antenna equipped with an evanescent filter with an unconventional geometry that facilitates high-precision additive printing.

The first signal can be an RHCP signal. The second signal can be an LHCP signal.

BRIEF DESCRIPTION OF FIGURES

Examples of implementation of the invention are shown in the description illustrated by the appended figures in which.

EXAMPLE(S) OF EMBODIMENT OF THE INVENTION

Figure 1:
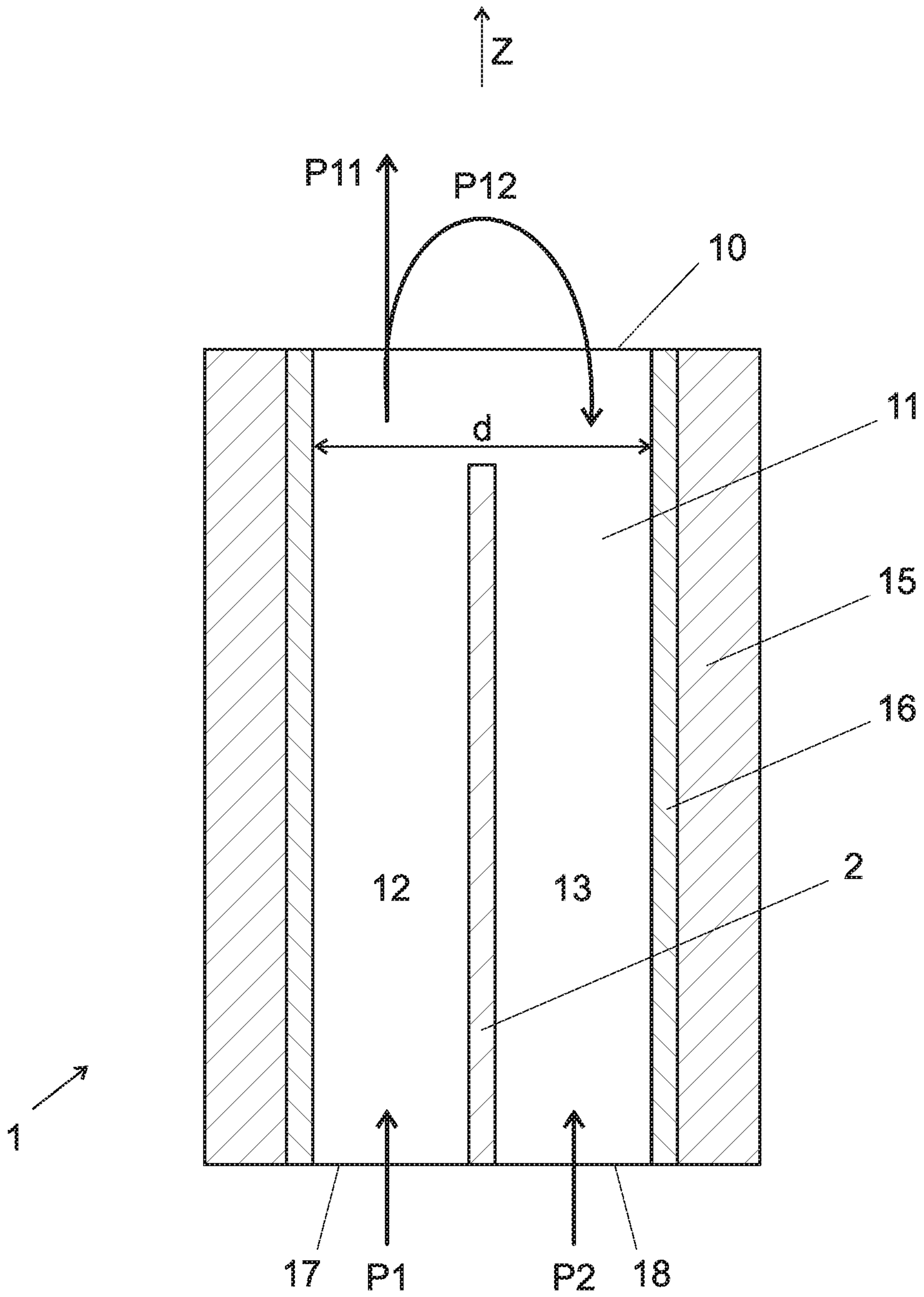
FIG. 1 shows a cross-section of a dual-polarized antenna without an evanescent filter.

FIG. 1 schematically illustrates a dual-polarized antenna 1 of an antenna array seen in longitudinal cross-section. The antenna comprises a 3D-printed core 15, at least the internal faces of which are coated with metallization 16. The core can be made of metal or insulating material, such as polymer or ceramic. Metallization 16 can also be provided on the antenna's external faces.

As the antennas of the array of the present invention are essentially identical, the term "the antenna" is to be understood in the sense of "each antenna of the antenna array" throughout the present description.

The antenna is provided with a longitudinal channel 11 opening onto an aperture 10 at one end of the antenna. The cross-section of channel 11 (disregarding any ridges, protuberances and the septum) may be for example square, rectangular, round, oval, ellipsoidal, hexagonal, octagonal, pentagonal, etc.

Channel 11 is divided by a septum 2 into two volumes 12 and 13. The first volume 12 opens onto a first port 17 intended to receive a first signal P1 with a first polarization. The second volume 13 opens onto a second port 18 intended to receive a second signal P2 with a second polarization. The polarizations can be circular polarizations. The second polarization may be orthogonal to the first polarization. The first signal may be an LHCP signal. The second signal can be an RHCP signal. The two signals P1 and P2 combine at the antenna output to form a single dual-polarized signal transmitted into the ether.

The term "ether" is used in the context of this application to designate the free space outside the antenna, and in which the signals emitted by the antenna propagate. In particular, this means that no device is intended to be coupled to the end of the antenna on the ether side. Hence, the ether may correspond, for example, to space itself when the antenna is mounted on an orbiting satellite, but more generally, the ether refers to any free space outside the antenna. The ether has its own impedance, which depends on the characteristics of the space surrounding the antenna.

One problem related to this arrangement concerns the reflection of part of the transmitted signal. As shown with arrows in FIG. 1, only part $P_{11}$ of the first signal P1 is diffused towards the ether; another part $P_{12}$ is reflected at the antenna output and returns to aperture 12, or even aperture 13. The result is a reduction in the power of the signal P11 actually transmitted, and a disturbance of the signals in channel 11.

The problem is amplified if the antenna is subwavelength, i.e. if the diameter of aperture 10 at the output of antenna 1 is less than half the wavelength of the nominal signal to be transmitted. The problem is also amplified if the antenna impedance does not match the impedance of the transmission channel through the ether.

Figure 2:
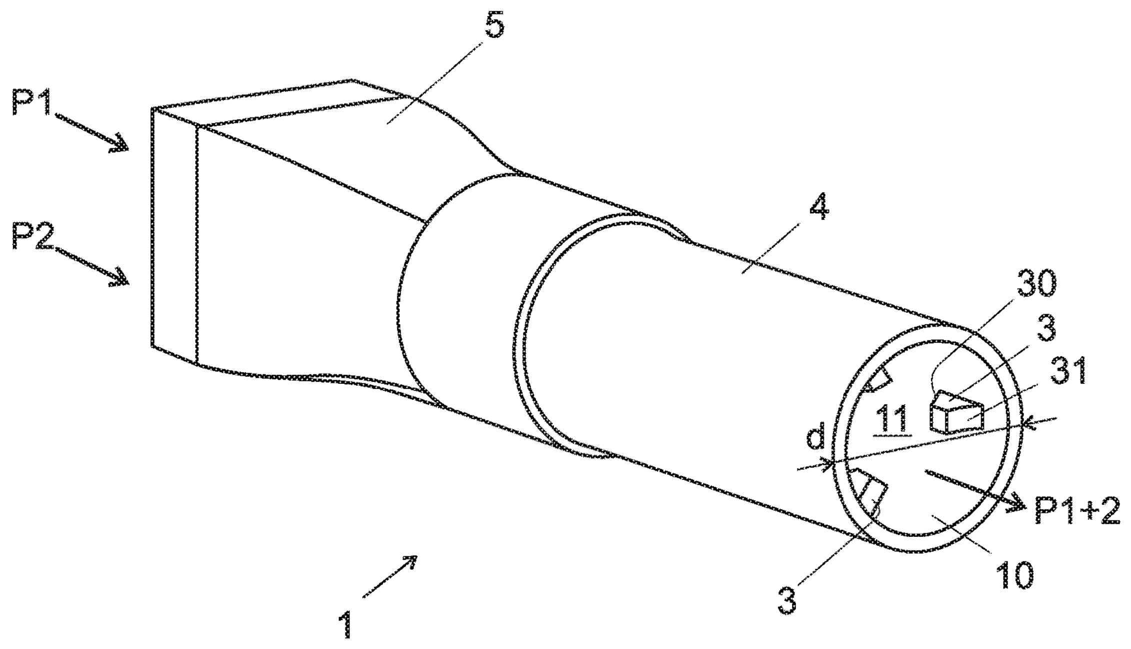
FIG. 2 shows a perspective view of an antenna with dual polarization and including an evanescent filter.
Figure 3:
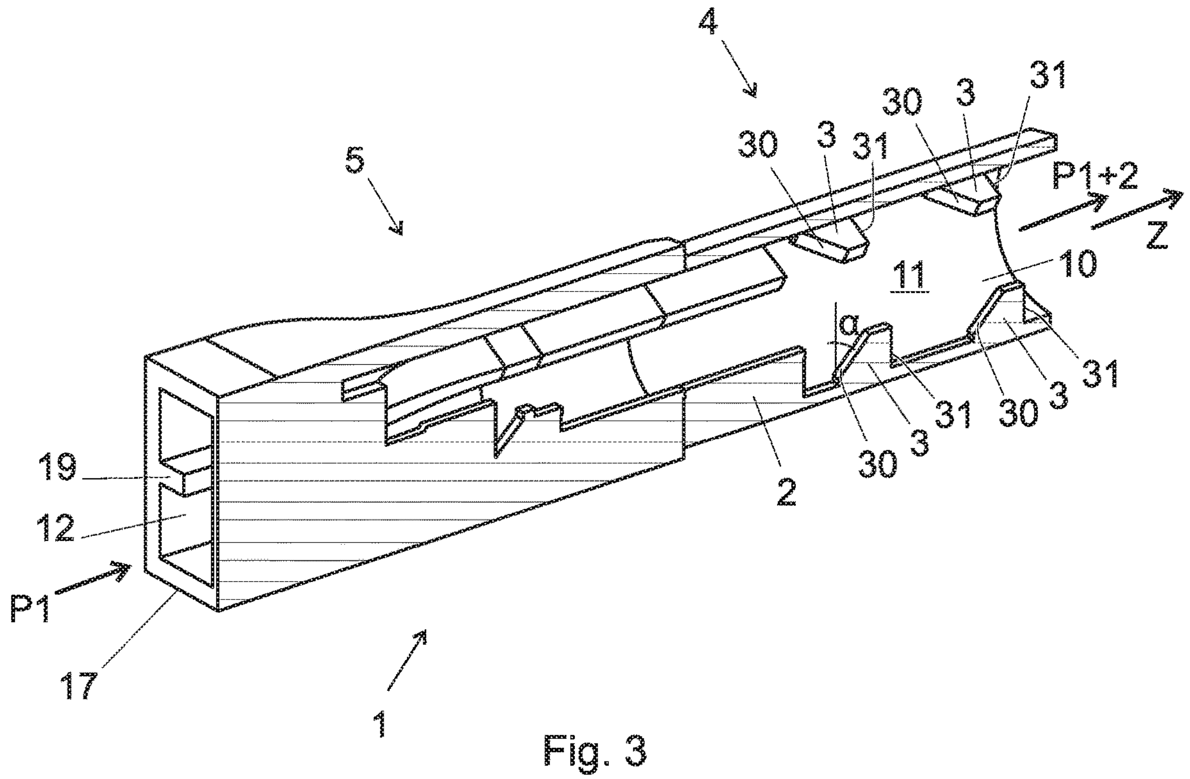
FIG. 3 shows a cross-sectional view of the antenna shown in FIG. 2.
Figure 4:
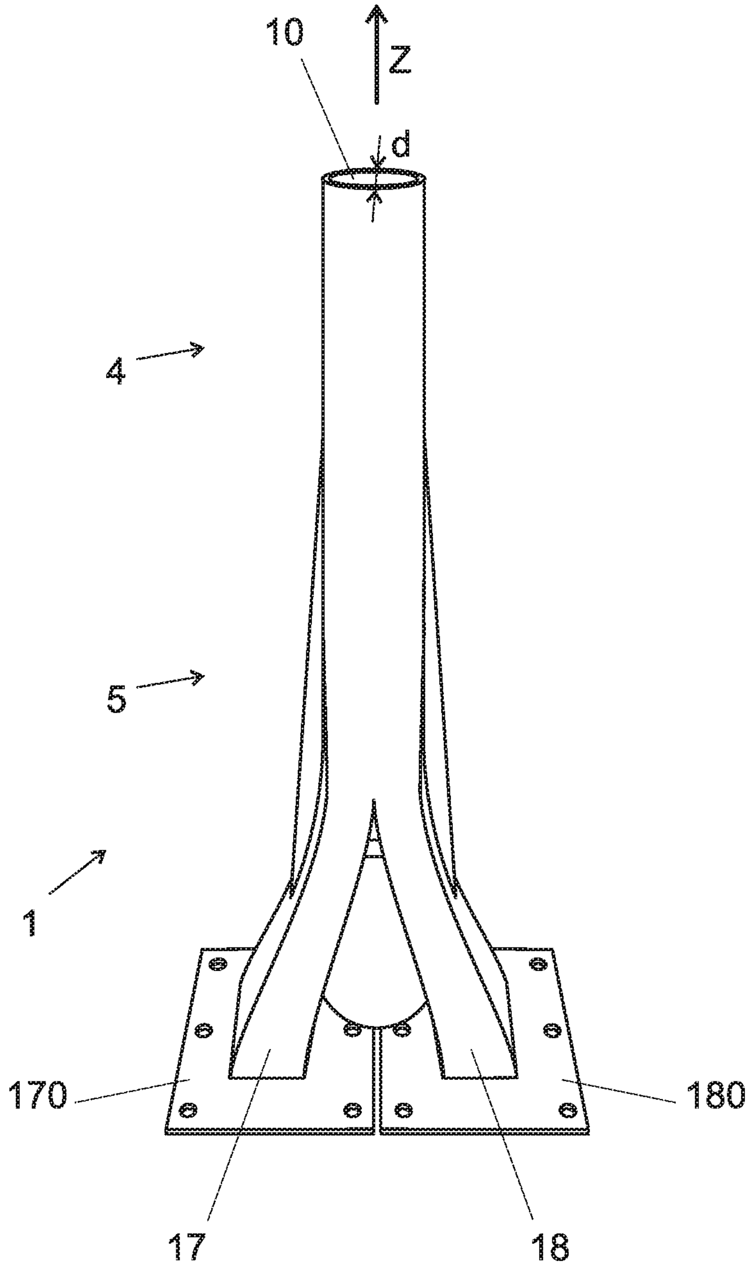
FIG. 4 shows a perspective view of another variant of an antenna with dual polarization.

The antennas shown schematically in FIGS. 2 to 4 allow to solve, or at least attenuate, this reflection of the transmitted signal at the antenna output. The characteristics of these antennas are identical to those of the antenna discussed above in connection with FIG. 1, and the above description also applies to the antennas of FIGS. 2 to 4; in particular, identical reference numbers designate identical elements.

The main difference between the embodiments shown in FIGS. 2 to 4 and the antenna shown in FIG. 1 is the presence of an evanescent filter 4 mounted directly at the output of polarizer 5, whose output aperture 10 is directly coupled to the ether. The evanescent filter thus acts directly as a radiating element to emit a dual-polarized signal P1+2 combining the polarized signals P1 and P2. The antenna thus consists of a polarizer 5 directly coupled to an evanescent filter 4.

The evanescent filter 4 preferably does not modify the polarizations of the signals through the antenna.

Polarizations can be circular polarizations.

The polarizer 5 may conform to the polarizer described in relation to FIG. 1; however, its output is coupled to the input of evanescent filter 4, instead of being coupled to the ether.

The polarizer of the antenna 1 shown in FIGS. 2 to 4 has two input ports 17 and 18, with only port 17 visible in the cross-section of FIG. 3. Each port can receive a signal P1 or P2 with a first or second polarization. Each port can be connected to a waveguide by means of a flange 170, respectively 180 as shown in FIG. 4, or directly connected to an active electronic circuit, for example by means of a coaxial cable.

The two ports 17, 18 are coupled to volumes 12 respectively 13 of the internal channel 11 of the antenna. These two volumes are separated from each other by a septum 2. As can be seen in FIG. 3, the height of this septum can decrease progressively or in steps from the ports 17, 18 towards the output opening 10.

The polarizer 5 can also be fitted with one or more longitudinal ridges 19. The use of ridges makes it possible to favor the transmission of a preferred transmission mode in a compact device.

In one embodiment, the polarizer 5 is provided with two longitudinal ridges 19, in addition to the septum 2. The two ridges can be at 120° to each other and to the septum. The two ridges can be 180° apart and 90° on either side of the septum.

The use of two ridges 19 in addition to the septum 2 significantly increases the antenna's single-mode bandwidth.

In an embodiment with two ridges in addition to the septum 2, 120° spacing of the two ridges on either side of the septum results in a channel geometry that is invariant to 120° rotation around the longitudinal axis of the channel. This configuration of ridges significantly increases the discrimination of higher-order modes with respect to the fundamental mode.

In one embodiment, the polarizer is provided with three longitudinal ridges 19, in addition to the septum 2. The three ridges can be at 90° to each other and to the septum.

A number of ridges greater than three can be used.

The ridges can be straight or twisted.

The average height of the ridges 19 in the radial direction is less than that of the septum 2. The height of the ridges may decrease from the ports 17, 18 towards the output opening 10.

In the example shown in FIGS. 2 to 3, the polarizer 5 has an external face shaped like a right prism, for example. Other external shapes, and other channel cross-sections 11, can also be considered. The shape of the polarizer's cross-section, as well as its surface, can gradually evolve from the polarizer input in direction of the evanescent filter 4, as shown in FIGS. 2 to 4.

In the context of the present invention, the evanescent filter can be seen as an impedance adapter between the polarizer and the ether.

When the array is miniaturized, the diameter of the internal channel of each evanescent filter no longer allows signal propagation as such, i.e. the filter waveguide is below the cut-off frequency. The protuberances on the filter's internal channel are therefore necessary for signal propagation in the antenna.

The evanescent filter 4 coupled to the output of polarizer 5 is provided with protuberances 3 (or teeth). To this end, the channel 11 of antenna 1 comprises several protuberances 3 separated from each other by portions of the channel 11.

The adjacent protuberances 3 are longitudinally spaced in pairs by a regular or variable pitch p.

The protuberances 3 can be arranged symmetrically around the longitudinal axis of the evanescent filter.

The protuberances 3 can be arranged in several rows, for example in line with the polarizer's ridges 19.

The protuberances 3 do not extend until the end of the antenna on the ether side. The ridges 19 do not extend until the end of the antenna on the ether side. The internal channel of the antenna therefore terminates on the ether side in a section devoid of ridges, protuberances and septum. This internal channel of the antenna ends on the ether side with an empty section, forming an iris between the polarizer and the ether for impedance matching.

In the example shown in FIGS. 2 to 4, the evanescent filter 4 has an outer face shaped like a cylinder, for example, while the channel 11 within the filter comprises a number of protuberances forming filtering sections. Other external shapes, and other sections of channel 11, may also be considered.

Antennas 1 with a square, rectangular, hexagonal or octagonal external cross-section can also be used. Likewise, the number of lines of protuberances can be different from three, although three lines is a preferred mode of execution in view of the advantages described above.

The cross-sectional shape of the evanescent filter can be different from the cross-sectional shape of the associated polarizer 5; for example, in FIGS. 2 and 3, polarizer 5 has a rectangular or square input cross-section, this gradually evolving to a circular shape to couple directly to an evanescent filter 4 of circular cross-section.

The geometric shape of the protuberances 3, and their arrangement, can for example be determined by computing software as a function of the desired bandwidth. The calculated geometric shape can be stored in a computer data medium.

It's important to note that the evanescent filter has identical phase performance for both modes. This means that the evanescent filter does not act as a polarizer, i.e. the phases of the two polarizations are unchanged in the filter.

The core 15 of the antenna 1 is preferably manufactured using an additive manufacturing process. The polarizer 5 and the evanescent filter 4 are preferably realized in a monolithic way, their core 15 being manufactured in a single additive printing step. In the present application, the expression "additive manufacturing" refers to any process for manufacturing the core by adding material, according to the computer data stored on the computer medium and defining the core's geometric shape.

Core 15 can, for example, be manufactured by an additive manufacturing process of the SLM (Selective Laser Melting) type. Core 15 can also be manufactured by other additive manufacturing methods, such as liquid or powder curing or coagulation, including but not limited to methods based on stereolithography, binder jetting, DED (Direct Energy Deposition), EBFF (Electron Beam Freedom Fabrication), FDM (Fused Deposition Modeling) PFF (Plastic Free Forming), aerosol, BPM (Ballistic Particle Manufacturing), SLS (Selective Laser Sintering), ALM (Additive Layer Manufacturing), polyjet, EBM (Electron Beam Melting), photopolymerization, etc.

The core may, for example, be a photopolymer made by several surface layers of liquid polymer cured by ultraviolet radiation in an additive manufacturing process.

The core can also be formed from a conductive material, such as a metallic material, by an additive manufacturing process of the SLM type, in which a laser or electron beam melts or sinter several thin layers of a powdery material.

In one embodiment, the metal layer 16 is deposited as a film by electroplating or galvanoplasty on the internal faces of the core 15. The metallization covers the internal faces of the core with a conductive layer.

The application of the metal layer can be preceded by a surface treatment step on the internal faces of the core to favor adhesion of the metal layer. The surface treatment may involve increasing the surface roughness and/or depositing an intermediate bonding layer.

Conventional additive manufacturing processes are not, however, particularly well-suited to conventional evanescent filters, especially filters that feature a number of protuberances 3 or cavities, since the arrangement of these protuberances creates cantilevered portions in the channel, which are difficult to maintain when printing the various strata. Reinforcements for these cantilevered portions must therefore be placed during the additive manufacturing process to prevent these parts from collapsing under the effect of gravity.

According to one aspect, and in order to remedy this drawback, the antenna 1 can be printed with the longitudinal axis z of the channel 11 in a vertical, or at least substantially vertical, position.

In another aspect, the protuberances 3 of channel 11 can be designed to facilitate this additive printing in a vertical position. Each protuberance 3 can thus have a face that is cantilevered when the filter is manufactured in a vertical position. In the example shown in FIGS. 2 and 3, the face 30 of protuberances 3 is cantilevered during additive manufacturing. The upper face 31 of protuberances 3 can extend in a plane substantially perpendicular to the longitudinal axis of channel 11, i.e. a horizontal plane during manufacturing. Alternatively, the top surface 31 may be inclined to this plane.

To enable additive printing, the cantilevered lower face 30 during printing can be inclined to the horizontal in the vertical manufacturing position. In a preferred embodiment, the lower face 30 forms an angle $\alpha$ with the horizontal which is between 20° and 80° and preferably between 20° and 40°.

The geometrical configuration of the antenna 1 according to this example has the advantage of enabling the core to be produced by an additive manufacturing process in a vertical direction opposite to gravity, without having to resort, during the core manufacturing process, to any reinforcement intended to avoid sagging of part of the core under the effect of gravity. Indeed, preferably, the angle $\alpha$ of the cantilevered faces 30 to the horizontal is sufficient to allow the superimposed layers to adhere before they harden during printing.

The protuberances 3 shown in the examples have polygonal longitudinal cross-sections, for example in the shape of a triangle or trapezium. However, other protuberance or tooth shapes can also be imagined, including, for example, protuberances with rounded portions (undulations) in cross-section.

The protuberances 3 shown in the examples have constant dimensions and, in particular, constant depths and heights. However, crenellations and/or teeth of variable depth and/or height can also be produced. In addition, the pitch p between successive crenellations or teeth can be variable.

In one embodiment, the channel 11 of each antenna 1 of the antenna array has a cross-section orthogonal to the longitudinal axis of the channel which is invariant to rotation through 120° about the longitudinal axis. This is particularly the case when the protuberances are spaced apart by 120° and/or when the polarizer has three longitudinal ridges spaced apart by 120°.

The 120° rotation invariance of the channel cross-section also imposes restrictions on the channel geometry. The external profile of the channel cross-section is thus, for example, circular, triangular, hexagonal, etc.

The antenna array of the present invention comprises at least two antennas 1, but is generally intended to include several tens of antennas 1 arranged in a parallel and contiguous manner. In such antenna arrangements, the periodicity of the array refers to the distance separating the centers of two successive antennas in the array, this distance typically being measured in a plane comprising the apertures of the antennas on the ether side.

In a particular embodiment, the periodicity of the antenna array is less than or equal to 80% of the nominal wavelength of the signals intended to be emitted/transmitted by each antenna. This value generally constitutes the threshold value below which reflection of signals towards adjacent antennas becomes problematic.

REFERENCE NUMBERS USED ON FIGS

1 Antenna with dual polarization
2 Septum
3 Protuberances
4 Evanescent filter
5 Septum polarizer
10 Opening
11 Internal channel
12 Volume
13 Volume
15 Core
16 Metallization
17 First port
18 Second port
30 Bottom face of the protuberances
31 Top face of the protuberances
170 First flange
180 Second flange
P1 First signal
P2 Second signal
P1+2 Dual-polarized signal

The invention claimed is:

1. Antenna array produced in a monolithic way, comprising at least two antennas with dual polarization, each antenna comprising:

at least one first port intended for a first signal with a first polarization;

at least one second port intended for a second signal with a second polarization;

a polarizer, comprising a septum for combining the signal on the at least one first port with the signal on the at least one second port; and a polarization-preserving evanescent filter, one end of which is directly coupled to the polarizer and the other end is directly coupled to the ether, that is the free space outside the antenna, to serve as radiating element of the antenna, said evanescent filter comprising an internal channel with at least one internal face provided with protuberances to match the impedance of the antenna to that of the ether.

2. Antenna array according to claim 1, wherein the diameter of the internal channel of each antenna is smaller than the nominal wavelength of the signal for which the antenna is designed.

3. Antenna array according to claim 1, wherein the septum does not extend until the end of the antenna on the ether side.

4. Antenna array according to claim 1, wherein said polarizer is provided with longitudinal ridges in addition to said septum.

5. Antenna array according to claim 4, wherein the longitudinal ridges do not extend until the end of each respective antenna on the ether side.

6. Antenna array according to claim 4, wherein said longitudinal lines are in the extension of said longitudinal ridges.

7. Antenna array according to claim 4, the longitudinal ridges being spaced 120° apart.

8. Antenna array according to claim 1, wherein said evanescent filter is provided with a plurality of successive protuberances along longitudinal lines.

9. Antenna array according to claim 8, wherein the protuberances do not extend until the end of each respective antenna on the ether side.

10. Antenna array according to claim 9, wherein said protuberances are arranged along 3 or 4 longitudinal lines.

11. Antenna array according to claim 1, wherein the diameter of the second end of the evanescent filter of each respective antenna is smaller than the nominal half-wavelength of said signals.

12. Antenna array according to claim 1, produced by 3D printing of at least two metal or polymer cores, then depositing a conductive layer at least on the internal faces of each antenna.

13. Antenna array according to claim 12, wherein said protuberances each comprises, in the direction of signal transmission, a first and a second surface, the first surface, referred to as the inclined surface, being inclined with respect to the second surface.

14. Antenna array according to claim 13, wherein said inclined surface of each protuberance is oblique with respect to a plane perpendicular to the longitudinal axis of the antenna.

15. Antenna array according to claim 13, wherein the inclined surface of each protuberance forms an angle of between 20° and 80°, preferably between 20° and 40°, with respect to said internal face.

16. Antenna array according to claim 1, wherein the internal channel of each antenna has a circular, square, rectangular, hexagonal or octagonal cross-section at its longitudinal axis, the protuberances being arranged along three faces of the internal channel.

17. Antenna array according to claim 1, wherein the internal channel of each antenna has a circular cross-section orthogonal to its longitudinal axis, the protuberances being arranged along three lines spaced 120° apart.

18. Antenna array according to claim 1, wherein the internal channel of each antenna has a cross-section orthogonal to its longitudinal axis invariant to rotation by 120° about said longitudinal axis, the protuberances being spaced apart by 120°.

19. Antenna array according to claim 1, the periodicity of at least two antennas being smaller than or equal to 80% of the nominal wavelength of said signals.

* * * * *